(12) United States Patent
Tsien et al.

(10) Patent No.: US 10,671,148 B2
(45) Date of Patent: Jun. 2, 2020

(54) MULTI-NODE SYSTEM LOW POWER MANAGEMENT

(71) Applicant: Advanced Micro Devices, Inc., Sunnyvale, CA (US)

(72) Inventors: Benjamin Tsien, Fremont, CA (US); Bryan P. Broussard, Austin, TX (US); Vydhyanathan Kalyanasundharam, San Jose, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 201 days.

(21) Appl. No.: 15/850,261

(22) Filed: Dec. 21, 2017

(65) Prior Publication Data

US 2019/0196574 A1   Jun. 27, 2019

(51) Int. Cl.
| | |
|---|---|
| *G06F 1/3296* | (2019.01) |
| *G06F 13/26* | (2006.01) |
| *G06F 12/0831* | (2016.01) |
| *G06F 1/3234* | (2019.01) |

(52) U.S. Cl.
CPC .......... *G06F 1/3296* (2013.01); *G06F 1/3275* (2013.01); *G06F 12/0833* (2013.01); *G06F 13/26* (2013.01)

(58) Field of Classification Search
CPC ............................... G06F 1/3296; G06F 13/26
See application file for complete search history.

(56) References Cited

U.S. PATENT DOCUMENTS

| | | |
|---|---|---|
| 4,980,836 A | 12/1990 | Carter et al. |
| 5,396,635 A | 3/1995 | Fung |
| 5,617,572 A | 4/1997 | Pearce et al. |
| 5,692,202 A | 11/1997 | Kardach et al. |
| 6,334,167 B1 | 12/2001 | Gerchman et al. |
| 6,657,634 B1 | 12/2003 | Sinclair et al. |
| 7,028,200 B2 | 4/2006 | Ma |

(Continued)

OTHER PUBLICATIONS

International Search Report and Written Opinion in International Application No. PCT/US2018/051789, dated Jan. 2, 2019, 14 pages.

(Continued)

*Primary Examiner* — Glenn A. Auve
(74) *Attorney, Agent, or Firm* — Kowert Hood Munyon Rankin and Goetzel PC; Rory D. Rankin

(57) ABSTRACT

Systems, apparatuses, and methods for performing efficient power management for a multi-node computing system are disclosed. A computing system including multiple nodes utilizes a non-uniform memory access (NUMA) architecture. A first node receives a broadcast probe from a second node. The first node spoofs a miss response for a powered down third node, which prevents the third node from waking up to respond to the broadcast probe. Prior to powering down, the third node flushed its probe filter and caches, and updated its system memory with the received dirty cache lines. The computing system includes a master node for storing interrupt priorities of the multiple cores in the computing system for arbitrated interrupts. The cores store indications of fixed interrupt identifiers for each core in the computing system. Arbitrated and fixed interrupts are handled by cores with point-to-point unicast messages, rather than broadcast messages.

20 Claims, 6 Drawing Sheets

(56) References Cited

U.S. PATENT DOCUMENTS

| | | | |
|---|---|---|---|
| 7,085,941 B2 | 8/2006 | Li | |
| 7,394,288 B1 * | 7/2008 | Agarwal | G06F 15/7867 326/39 |
| 7,428,644 B2 | 9/2008 | Jeddeloh et al. | |
| 7,437,579 B2 | 10/2008 | Jeddeloh et al. | |
| 7,496,777 B2 | 2/2009 | Kapil | |
| 7,613,941 B2 | 11/2009 | Samson et al. | |
| 7,743,267 B2 | 6/2010 | Snyder et al. | |
| 7,800,621 B2 | 9/2010 | Fry | |
| 7,802,060 B2 | 9/2010 | Hildebrand | |
| 7,840,827 B2 | 11/2010 | Dahan et al. | |
| 7,868,479 B2 | 1/2011 | Subramaniam | |
| 7,873,850 B2 | 1/2011 | Cepulis et al. | |
| 7,899,990 B2 | 3/2011 | Moll et al. | |
| 8,181,046 B2 | 5/2012 | Marcu et al. | |
| 8,402,232 B2 | 3/2013 | Avudaiyappan et al. | |
| 8,438,416 B2 | 5/2013 | Kocev et al. | |
| 8,656,198 B2 | 2/2014 | Branover et al. | |
| 8,924,758 B2 | 12/2014 | Steinman et al. | |
| 9,983,652 B2 | 5/2018 | Piga et al. | |
| 2004/0015628 A1 | 1/2004 | Glasco et al. | |
| 2010/0106876 A1 | 4/2010 | Nakahashi et al. | |
| 2011/0153924 A1 | 6/2011 | Vash et al. | |
| 2011/0264934 A1 | 10/2011 | Branover et al. | |
| 2012/0254526 A1 | 10/2012 | Kalyanasundharam | |
| 2013/0311804 A1 | 11/2013 | Garg et al. | |
| 2014/0095801 A1 | 4/2014 | Bodas et al. | |
| 2014/0122833 A1 * | 5/2014 | Davis | G06F 15/7803 712/29 |
| 2014/0281275 A1 | 9/2014 | Kruckemyer et al. | |
| 2019/0204899 A1 | 7/2019 | Tsien et al. | |

OTHER PUBLICATIONS

International Search Report and Written Opinion in International Application No. PCT/US2018/051916, dated Jan. 31, 2019, 10 pages.

Yuan et al., "Buffering Approach for Energy Saving in Video Sensors", 2003 International Conference on Multimedia and Expo, Jul. 2003, 4 pages.

"Intel Power Management Technologies for Processor Graphics, Display, and Memory: White Paper for 2010-2011 Desktop and Notebook Platforms", Intel Corporation, Aug. 2010, 10 pages.

* cited by examiner

MULTI-NODE SYSTEM LOW POWER MANAGEMENT

BACKGROUND

Description of the Related Art

The power consumption of modern integrated circuits (IC's) has become an increasing design issue with each generation of semiconductor chips. As power consumption increases, more costly cooling systems such as larger fans and heat sinks must be utilized in order to remove excess heat and prevent IC failure. However, cooling systems increase system costs. The IC power dissipation constraint is not only an issue for portable computers and mobile communication devices, but also for desktop computers and servers utilizing high-performance microprocessors. These microprocessors include multiple processor cores, or cores, and multiple pipelines within a core.

A variety of computing devices, such as a variety of servers, utilize heterogeneous integration, which integrates multiple types of ICs for providing system functionality. The multiple functions are placed in a processing node and the multiple functions include audio/video (A/V) data processing, other high data parallel applications for the medicine and business fields, processing instructions of a general-purpose instruction set architecture (ISA), digital, analog, mixed-signal and radio-frequency (RF) functions, and so forth. A variety of choices exist for placing a processing node in system packaging to integrate the multiple types of ICs. The processing node includes the multiple ICs, a communication fabric, a power controller, an interrupt controller, link interfaces, and so forth.

In some computing devices, a system-on-a-chip (SOC) is used, whereas, in other computing devices, smaller and higher-yielding chips of the processing node are packaged as large chips in multi-chip modules (MCMs). Some computing devices include three-dimensional integrated circuits (3D ICs) that utilize die-stacking technology as well as silicon interposers, through silicon vias (TSVs) and other mechanisms to vertically stack and electrically connect two or more dies in a system-in-package (SiP).

Regardless of the choice for system packaging, powering down the computing system with multiple sockets, each with a copy of the selected package, is complicated. Each package includes a power controller, and thus, the system has multiple power controllers. If each power controller is connected to each other power controller in the system, then communicating when to power down the system becomes easier. However, scaling the system, such as increasing the number of sockets for increasing performance, becomes difficult if each power controller is to be directly connected to each other power controller in the system. In addition, routing the multiple connections increases the amount of signals between sockets and increases the area for interfaces. Further, powering down a processing node includes multiple steps. When a given processing node is powered down, and then soon after, the given processing node is awakened, an appreciable latency transpires before the given processing node is ready to handle tasks. Therefore, performance reduces when nodes are powered down and powered back up soon afterward.

In view of the above, efficient methods and systems for performing efficient power management for a multi-node computing system are desired.

BRIEF DESCRIPTION OF THE DRAWINGS

The advantages of the methods and mechanisms described herein may be better understood by referring to the following description in conjunction with the accompanying drawings, in which.

Figure 1:
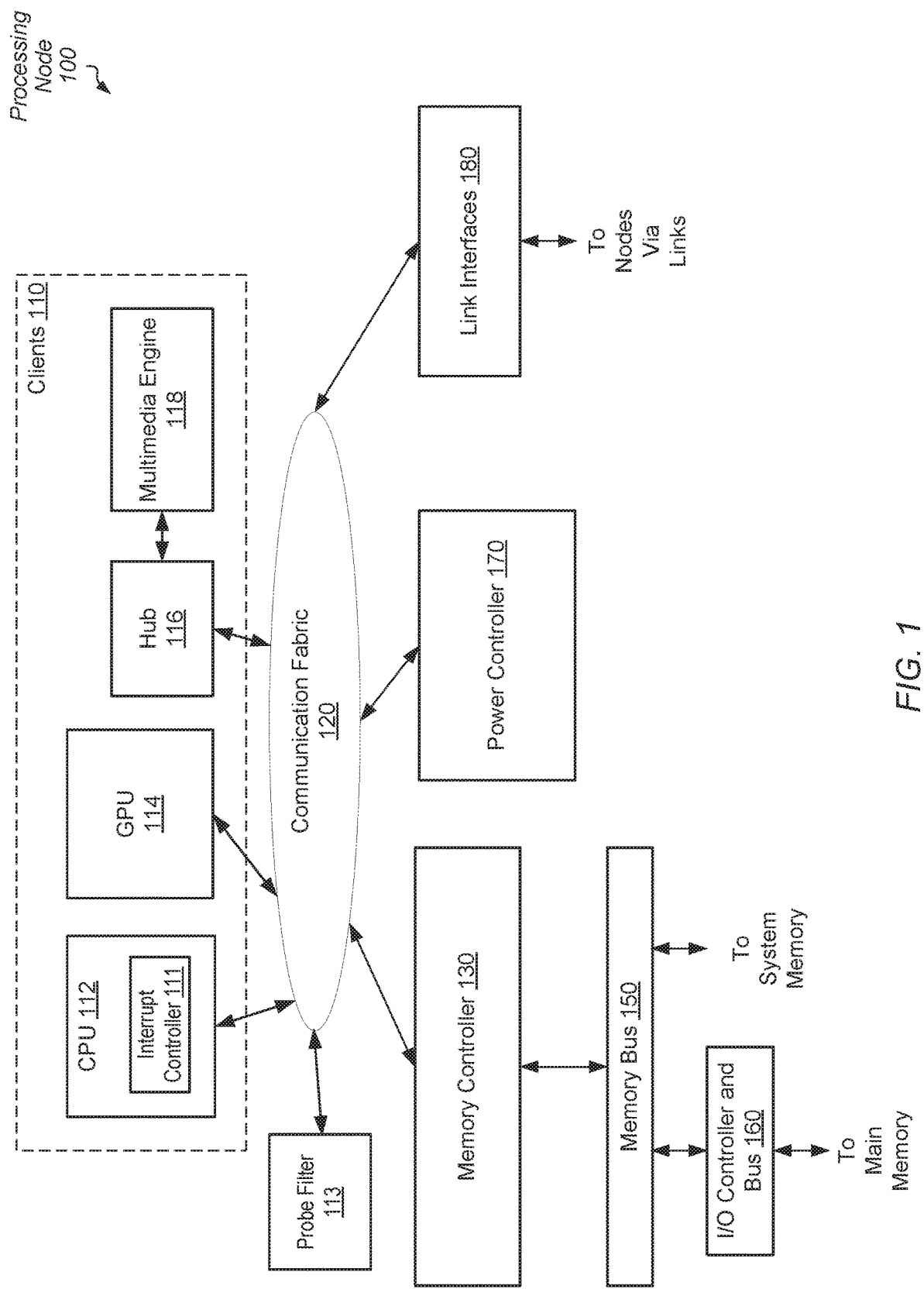
FIG. 1 is a block diagram of one embodiment of a processing node.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient power management for a multi-node computing system are disclosed. In various embodiments, a processing node includes one or more clients for processing applications. Examples of the clients within the node include a general-purpose central processing unit (CPU), a graphics processing unit (GPU), an accelerated processing unit (APU), an input/output (I/O) device and so forth. The processing node also includes at least a power controller, and multiple link interfaces for transferring messages with other nodes. As used herein, a processing node is also referred to as a node.

In some embodiments, a computing system is a multi-node system, which includes multiple copies of the node, each with its own one or more clients and power controller. In various embodiments, the computing system utilizes a shared memory architecture where a given processor in a given node accesses its local memory with a smaller latency than accessing remote memory of another node. In other words, the computing system utilizes a non-uniform memory access (NUMA) architecture and each of the nodes in the computing system is a NUMA node.

The power controller of a first node of the multiple nodes determines when each client of its one or more clients is idle. In addition, the power controller determines when there are no remote memory requests attempting to access the system memory of the first node such as dynamic random access memory (DRAM) of the first node. When the power controller determines these conditions are satisfied, in an embodiment, the power controller sends an indication to one or more nodes on one or more of its links specifying a powered down state of the first node. Afterward, the first node performs multiple steps in order to power down such as flushing its caches, invalidating each entry of a probe filter, and updating the system memory connected to the first node with dirty cache lines received as a result of invalidating entries in the probe filter. Afterward, the steps include disabling drivers for link interfaces, disabling clocks for the one or more clients and a communication fabric transferring traffic between the one or more clients and a memory controller, and setting system memory to perform self-refresh when dynamic random access memory (DRAM) is used.

In order to increase an amount of time the first node remains powered down, in one embodiment, flushing the caches and invalidating the probe filter as described above are performed. In other embodiments, a second node, which is directly connected to the powered down first node, receives a broadcast probe from a third node, and the second node generates a miss response for the powered down first node when the second node determines the first node is powered down. The second node does not send the broadcast probe to the first node, which would wake up the first node and cause the first node to transition from the powered down state to an active state. The second node sends the miss response to the third node on behalf of the powered down first node.

In some embodiments, the computing system includes a master node for storing interrupt priorities of the multiple processor cores in the computing system where the interrupt priorities correspond to arbitrated interrupts. Therefore, arbitrated interrupts are handled by processor cores with point-to-point unicast messages, rather than broadcast messages. Similarly, the multiple processor cores in the computing system handle fixed interrupts with point-to-point messages, rather than broadcast messages by supporting the storage of fixed interrupt identifiers (IDs) for each processor core of the multiple processor cores. Therefore, the powered down nodes are not awakened by broadcast probes for handling interrupts. These and other embodiments are possible and are contemplated.

Referring to FIG. 1, a generalized block diagram of one embodiment of a processing node 100 is shown. As shown, processing node 100 includes communication fabric 120 between each of clients 110, probe filter 113, memory controller 130, power controller 170 and link interfaces 180. In some embodiments, the components of processing node 100 are individual dies on an integrated circuit (IC), such as a system-on-a-chip (SOC). In other embodiments, the components are individual dies in a system-in-package (SiP) or a multi-chip module (MCM).

In various embodiments, communication fabric 120 transfers traffic back and forth between clients 110 and memory controller 130 and includes interfaces for supporting respective communication protocols. In some embodiments, communication fabric 120 includes at least queues for storing requests and responses, selection logic for arbitrating between received requests before sending requests across an internal network, logic for building and decoding packets, and logic for selecting routes for the packets.

In the illustrated embodiment, clients 110 include central processing unit (CPU) 112, graphics processing unit (GPU) 114 and Hub 116. Hub 116 is used for communicating with Multimedia Engine 118. The CPU 112, GPU 114 and Multimedia Engine 118 are examples of computing resources capable of processing applications. Although not shown, in other embodiments, other types of computing resources are included in clients 110. In an embodiment, GPU 114 includes a high parallel data microarchitecture with a significant number of parallel execution lanes. In one embodiment, the microarchitecture uses single-instruction-multiple-data (SIMD) pipeline for the parallel execution lanes. Multimedia Engine 118 includes processors for processing audio data and visual data for multimedia applications.

In some embodiments, each of the one or more processor cores in CPU 112 includes circuitry for executing instructions according to a given selected instruction set architecture (ISA). In various embodiments, each of the processor cores in CPU 112 includes a superscalar, multi-threaded microarchitecture used for processing instructions of the given ISA. As used herein, the processor cores are also referred to as cores. In one embodiment, CPU 112 includes 8 cores, each including 2 hardware threads for processing 2 software threads. Therefore, in such an embodiment, CPU 112 is capable of simultaneously processing 16 threads. In other embodiments, any number of threads for simultaneous multi-threading is supported by CPU 112.

Link interfaces 180 support communication between processing node 100 and other processing nodes by transferring messages on links. In various embodiments, the messages sent across the links between nodes include an indication of an operating state for one or more nodes, responses to requests, interrupts, and other information. In various embodiments, each link is a point-to-point communication channel between two nodes. At the physical level, a link includes one or more lanes. In some embodiments, link interfaces 180, the corresponding links, and other nodes include communication protocol connections such as PCIe (Peripheral Component Interconnect Express), InfiniBand, RapidIO, HyperTransport, and so forth. In some embodiments, link interfaces 180 include control logic and buffers or queues used to communicate with other nodes via the interconnect links.

Although a single memory controller 130 is shown, in other embodiments, another number of memory controllers are used in processing node 100. In various embodiments, memory controller 130 receives memory requests from clients 110 via the communication fabric 120, schedules the memory requests, and sends the scheduled memory requests to one or more of system memory and main memory. Memory controller 130 also receives responses from system memory and main memory and sends the responses to a corresponding source of the request in clients 110. In various embodiments, system memory is filled with data from main memory through the I/O controller and bus 160 and the memory bus 150. A corresponding cache fill line with the requested block is conveyed from main memory to a corresponding one of the cache memory subsystems in clients 110 in order to complete the original memory request. The cache fill line is placed in one or more levels of caches.

In some embodiments, the address space of processing node 100 is divided among at least CPU 112, GPU 114 and Hub 116 and one or more other components such as input/ output (I/O) peripheral devices (not shown) and other types of computing resources. Memory maps are maintained for determining which addresses are mapped to which component, and hence to which one of CPU 112, GPU 114 and Hub 116 a memory request for a particular address should be routed. In an embodiment, system memory is one of a variety of dynamic random access memory (DRAM) and a corresponding protocol is supported by memory controller 130. The protocol determines values used for information transfer, such as a number of data transfers per clock cycle, signal voltage levels, signal timings, signal and clock phases and clock frequencies. In some embodiments, main memory is one of a variety of types of non-volatile, random access secondary storage of data. Examples of main memory are hard disk drives (HDDs) and solid-state disks (SSDs).

In one embodiment, power controller 170 collects data from clients 110. In some embodiments, power controller 170 also collects data from memory controller 130. In some embodiments, the collected data includes predetermined sampled signals. The switching of the sampled signals indicates an amount of switched capacitance. Examples of the selected signals to sample include clock gater enable signals, bus driver enable signals, mismatches in content-addressable memories (CAM), CAM word-line (WL) drivers, and so forth. In an embodiment, power controller 170 collects data to characterize power consumption in node 100 during given sample intervals.

In some embodiments, on-die current sensors and temperature sensors in node 100 also send information to power controller 170. Power controller 170 uses one or more of the sensor information, a count of issued instructions or issued threads, and a summation of weighted sampled signals to estimate power consumption for node 100. Power controller 170 decreases (or increases) power consumption if node 100 is operating above (below) a threshold limit. In some embodiments, power controller 170 selects a respective power-performance state (P-state) for each of the computing resources in clients 110. The P-state includes at least an operating voltage and an operating clock frequency. In various embodiments, power controller 170 and node 100 supports N P-states where N is a positive non-zero integer.

In various embodiments, processing node 100 is one node of multiple nodes in a multi-node system. In an embodiment, the system is a server of multiple servers. Sometimes jobs sent as a batch to the servers are not assigned to each server. A given server can become idle for an appreciable amount of time. To reduce power consumption, the multiple nodes within the server can power down. In various embodiments, power controller 170 detects when one or more of clients 110 become idle. If each of the clients 110 becomes idle, then in an embodiment, power controller 170 relays an indication to one or more nodes on one or more of its links via link interfaces 180 specifying a powered down state. In some embodiments, power controller 170 sends a message to each of CPU 112 and GPU 114 to flush each cache in its cache memory sub system.

Additionally, power controller 170 sends a message to invalidate each entry of probe filter 113 as well as updating the system memory with dirty cache lines received as a result of invalidating the entries in probe filter 113. Afterward, power controller 170 sends messages to disable drivers for link interfaces, disable clocks for the clients 110 and communication fabric 120, memory controller 130, and setting system memory to perform self-refresh when dynamic random access memory (DRAM) is used.

Many directory based cache coherency protocols include the use of messages, or probes, passed from a coherency point, such as a memory controller, to communicate between various caches within a computing system. In an embodiment, communication fabric 120 maintains probe filter 113. In various embodiments, probe filter 113 is implemented as a directory with multiple entries. The entries of probe filter 113 contain information indicating the existence of cached copies of data. In some embodiments, each entry stores a valid bit, a tag of a cache line, an indication that specifies a cache coherency state of the cache line, a node ownership identifier (ID), one or more node IDs of remote nodes with remote clients storing a cached copy of data in local system memory, a clean/dirty state, and so forth. In some embodiments, the cache coherency states are modified, owned, exclusive, shared, and invalid.

The entries in probe filter 113 track each cache line in processing node 100 which has copies stored in caches of other processing nodes in the computing system. If a line stored in system memory is cached whether locally in processing node 100 or remotely in another processing node, then an entry for the line is allocated in probe filter 113. The absence of an allocated entry in probe filter 113 entry indicates a particular line is uncached. Rather than unconditionally broadcasting probes, probe filter 113 is used to determine particular subsystems (that may contain cached copies of the data) to which probes need to be conveyed in order to cause specific coherency actions.

In various embodiments, each of the multiple threads being processed by CPU 112 is capable of asserting interrupts and receiving an address of an interrupt service routine. In various embodiments, processing node 100 is one node of a multi-node computing system supporting an interrupt redirection protocol for routing interrupts in a multiprocessor computing system. This protocol sends interrupts between processors in the multiple nodes of the computing system. Based on an interrupt mode or an interrupt type, an interrupt is sent from a processor detecting the interrupt to a particular processor in a particular node based on an interrupt identifier (ID). In one example, the ID is used to identify the particular processor in the particular node. As used herein, these types of interrupts are referred to as "fixed interrupts." The processor selected for handling the fixed interrupt is fixed based on the ID. Similarly, based on a different interrupt mode or different interrupt type, an interrupt is sent from a processor detecting the interrupt to a processor in a particular node based on arbitration. In one example, each hardware thread or each core in a processor is assigned an interrupt priority and the processor(s) with the lowest priority are selected by arbitration logic to handle an asserted interrupt. As used herein, these types of interrupts are referred to as "arbitrated interrupts." In some embodiments, the protocol used for sending interrupts between different processors is the APIC (Advanced Programmable Interrupt Controller) protocol, and the identifiers used to identify either a core or a hardware thread within a core is an APIC ID.

In an embodiment, interrupt controller 111 receives the multiple interrupts asserted by the multiple threads running on CPU 112 in addition to multiple interrupts asserted by cores on remote CPUs via link interfaces 180. Interrupt controller 111 also routes the interrupts to other cores in CPU 112 and other cores in remote CPUs via link interfaces 180 based on a selected interrupt routing protocol such as the APIC protocol. In some examples, interrupt controller 111 sends the interrupts to other cores for servicing the interrupts. The other cores whether local or remote service the interrupt by processing a given interrupt service routine, which is also referred to as an interrupt handler. In some embodiments, interrupt controller 111 is located outside of CPU 112 and receives interrupts from multiple other sources such as GPU 114, Hub 116, I/O peripheral devices, and remote computing devices via communication fabric 120.

In various embodiments, processing node 100 is a master node in a multi-node system for storing interrupt priorities of the multiple processor cores for arbitration of interrupts in the computing system. In the earlier example, CPU 112 has 8 cores, each capable of simultaneously processing 2 threads. Therefore, in one embodiment, CPU 112 has 16 interrupt priorities for arbitrated interrupts, one for each of the 16 hardware threads, and 2 interrupt priorities per core. In other embodiments, the granularity of the interrupt priorities for arbitrated interrupts is at the core level, and each of the multiple hardware threads for a given core has a same interrupt priority for arbitrated interrupts. In yet other embodiments, each thread is set with a same interrupt priority. Other combinations of interrupt priority assignments to threads are possible and contemplated.

If the computing system has 4 nodes, each with a similar CPU as CPU 112, and each core has 2 interrupt priorities for arbitrated interrupts, then, in some embodiments, the computing system has 64 interrupt priorities. However, for arbitrated interrupts, in an embodiment, the hardware thread (or core) with the lowest interrupt priority is assigned to service the arbitrated interrupt. In some embodiments, interrupt controller 111 stores 4 interrupt priorities, one interrupt priority for arbitrated interrupts for each of the 4 nodes. The one interrupt priority for a given node is the lowest interrupt priority of the 16 interrupt priorities assigned to cores in the given node.

When a core in a first node other than the master node asserts an arbitrated interrupt, the first node sends a message point-to-point via link interfaces 180 and communication fabric 120 to the interrupt controller 111 of the master node. In such a case a broadcast message is not used by the first node to notify each other node to send one or more interrupt priorities to the first node. In response to the point-to-point communication from the first node, interrupt controller 111 of the master node determines the lowest interrupt priority of the 4 stored interrupt priorities. In an embodiment, interrupt controller 111 of the master node also identifies a second node, which includes a core with the identified lowest interrupt priority of the 4 stored interrupt priorities. In various embodiments, interrupt controller 111 of the master node sends in a point-to-point message the arbitrated interrupt to the identified core in the second node. Therefore, arbitrated interrupts are handled with point-to-point unicast messages, rather than broadcast messages. In various embodiments, similar point-to-point communication is used when a local core in the master node, an input/output (I/O) device, or other asserts the arbitrated interrupt, rather than the arbitrated interrupt is asserted by a remote node such as the first node in the above example.

In various embodiments, software, such as the operating system, reassigns the interrupt priorities for arbitrated interrupts of the cores within processing node 100, which is being powered down. In an embodiment, the software reassigns the interrupt priorities to a maximum value or at least a value greater than interrupt priorities of active nodes. Therefore, powered down nodes are not selected by a master node to wake up and service an asserted arbitrated interrupt in the computing system.

When a core within CPU 112 asserts an arbitrated interrupt, a message is sent to interrupt controller 111. In response, interrupt controller 111 sends the lowest interrupt priority of the 4 stored interrupt priorities in a response. The remaining steps are the same as above such as sending in a unicast communication the arbitrated interrupt to the identified core in the node identified in the response. Again, no broadcast messages are sent. Therefore, powered down nodes are not awakened by broadcast probes for handling arbitrated interrupts. Using unicast messages, rather than broadcast messages, is also performed for fixed interrupts in addition to arbitrated interrupts.

Figure 2:
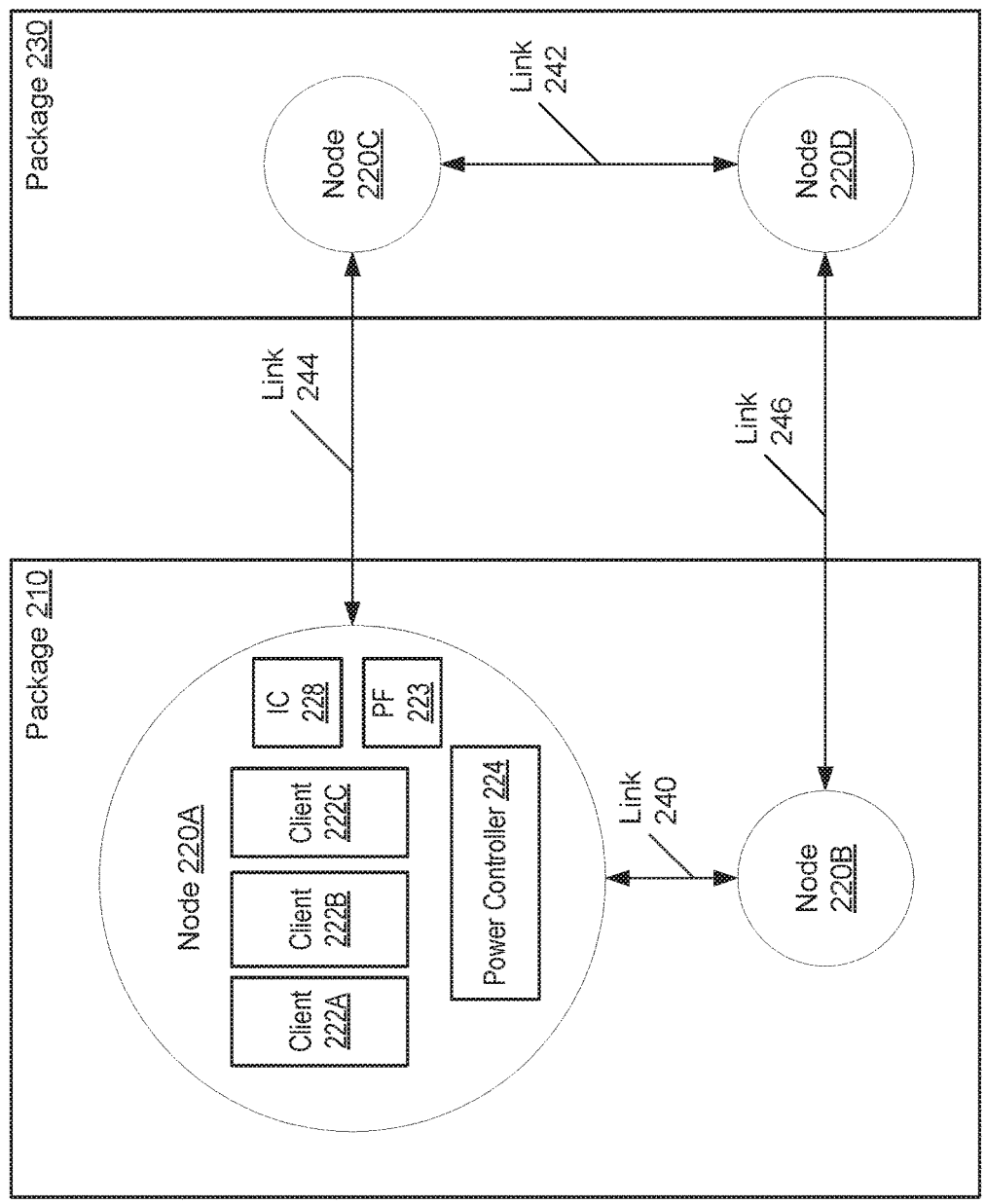
FIG. 2 is a block diagram of one embodiment of a multi-node computing system.

Referring to FIG. 2, a generalized block diagram of one embodiment of a multi-node computing system 200 is shown. In the illustrated embodiment, package 210 includes nodes 220A and 220B directly connected to one another by link 240. In some embodiments, each of package 210 and 230 is a multi-chip module (MCM) placed in a socket of a multi-socket motherboard in a server. As shown, node 220A includes clients 222A-222C, a power controller 224 and an interrupt controller (IC) 228. Examples of clients 222A-222C are a CPU, a GPU, a multimedia engine, an I/O peripheral device, and so forth. As shown, at least client 222A includes probe filter (PF) 223.

In some embodiments, interrupt controller 228 is located within one of the clients 222A-222C, rather than used as a standalone controller. In various embodiments, power controller 224 has the functionality of power controller 170 (of FIG. 1). Link interfaces, a communication fabric, a memory interface, phased locked loops (PLLs) or other clock generating circuitry are not shown for ease of illustration.

In an embodiment, links 240-246 utilize communication protocol connections such as PCIe, InfiniBand, RapidIO, HyperTransport, and so forth. In some embodiments, computing system 200 includes other links between nodes 220A-220D in addition to links 240-246. In an embodiment, these other links are used for data transport to service requests, whereas, links 240-246 are used for messaging such as messages for negotiating system-wide power down.

In various embodiments, computing system 200 uses a hierarchical topology where each of the nodes 220A-220D is a requestor. At a low- or first-level of the hierarchy, each node is directly connected to each other node. For example, node 220A is directly connected to node 220B in package 210 through link 240. Similarly, node 220C is directly connected to node 220D in package 230 through link 242. At a higher- or second-level of the hierarchy, each node is connected to a single node in the other hierarchy. For example, node 220A in package 210 is directly connected to node 220C in package 230 through link 244. However, node 220A is not directly connected to node 220D in package 230. Similarly, node 220B in package 210 is directly connected to node 220D in package 230 through link 246. However, node 220B is not directly connected to node 220C in package 230. In other embodiments, a tree or ring topology is used where each intermediate nodes between a root node and a leaf node is directly connected to a single upstream node and directly connected to a single downstream node. A variety of other topologies are possible and contemplated in other embodiments.

In one example, if node 220B is powered down, in order to increase an amount of time the node 220B remains powered down, in one embodiment, flushing the caches and invalidating probe filter 223 are performed. Additionally, another node, which is directly connected to the powered down node 220B, such as node 220A, spoofs a response on behalf of the powered down node 220B for particular broadcast probes. In one example, node 220A receives a broadcast probe from node 220C searching for a most recent valid copy of a cache line. Since node 220B flushed its one or more cache memory subsystems prior to powering down, node 220B cannot have a copy of the requested cache line.

Node 220A generates a miss response for the powered down node 220B when node 220A determines node 220B is powered down. In some embodiments, node 220D also generates a miss response on behalf of the powered down node 220B when node 220D determines node 220B is powered down. Neither one of node 220A and 220D sends the broadcast probe to the powered down node 220B, which would wake up node 220B and cause node 220B to transition from the powered down state to an active state simply to report a miss response due to its empty caches. One or more of node 220A and node 220D sends the miss response to node 220C on behalf of the powered down node 220B. One or more of power controller 224 and the logic for the link interfaces (not shown) detects the condition of a broadcast probe for a cache line and node 220B is powered down. Accordingly, the logic spoofs the miss response on behalf of the powered down node 220B.

In various embodiments, computing system 200 utilizes a shared memory architecture where a given processor in a given one of nodes 220A-220D accesses its local memory with a smaller latency than accessing remote memory of another node. In other words, computing system 200 utilizes a non-uniform memory access (NUMA) architecture and each of the nodes 220A-220D is a NUMA node. In an embodiment, a communication fabric (not shown) in node 220A maintains probe filter (PF) 223 as memory requests are serviced. In various embodiments, probe filter 223 has the functionality and stores the same type of information as probe filter 113 (of FIG. 1).

In an embodiment, an entry in probe filter 223 contains information indicating that one or more of nodes 220B-220D contain shared copies of a block of data. In response to a command for exclusive access to that block, invalidation probes are conveyed to one or more of nodes 220B-220D. Generally speaking, the node of nodes 220A-220D that issues a request is referred to as a "Requesting" node. A node of nodes 220A-220D is referred to as a "Home" node if the memory address of the request maps to a system memory coupled to that node. A node of nodes 220A-220D is referred to as an "Owner" node if a cache within that node currently stores the most recent copy of the memory block. Probes are used to determine if the caches have a copy of a block and optionally to indicate the state into which the cache should place the block. Each node receiving a probe checks its probe filter and responds to the probe. Once all probe responses are received, the command proceeds to completion.

When power controller 224 of node 220A determines each one of clients 222A-222C is idle and that there are no remote memory requests attempting to access the system memory of node 220A, in an embodiment, system wide power controller 224 sends an indication to one or more of nodes 2202B-220D specifying a powered down state of node 220A. Afterward, system wide power controller 224 sends a message to clients 222A-222C to flush their caches and to invalidate each entry of a probe filter such as probe filter 223. Node 220A updates its system memory with dirty cache lines received as a result of invalidating the entries in probe filter 223.

In some embodiments, power controller 224 proceeds with powering down node 220A after the above steps are performed. In other embodiments, power controller 224 proceeds with powering down if a given latency has expired after the above steps are performed. If the given latency has not yet expired, and tasks are received, in an embodiment, power controller 224 transitions node 220A from an idle state to an active state, sends an indication of the active state on each of its links 240 and 244, and sends an indication to clients 222A-222C to process the received tasks. In still other embodiments, power controller 224 uses additional information along with the latency to determine whether to proceed with powering down node 220A or process the received tasks. Examples of the additional information are a quality-of-service (QoS) or other priority level for the tasks, a process or software thread identifier (ID), a hardware ID identifying one of the clients 222A-222C, and so forth. If power controller 224 determines node 220A is powering down, then in an embodiment, power controller 224 disables drivers for link interfaces, disables clocks for clients 222A-222C and sets system memory to perform self-refresh when DRAM is used.

A wake up condition can occur at any time including soon after power controller 224 has powered down node 220A. Wake up conditions include one or more of receiving a remote request from an active node for a local cache probe, receiving a remote memory request from an active node for local data in system memory, receiving assigned tasks from the operating system, and so forth. The above steps include flushing caches prior to powering down, invalidating probe filters prior to powering down, storing fixed interrupt IDs in each one of nodes 220A-220D, storing the lowest interrupt priorities for nodes in a master node of nodes 220A-220D, and spoofing a miss response on behalf of a powered down node for a broadcast probe seeking a particular cache line. Additionally, software, such the operating system, aids in lengthening the amount of time for a node to remain in a powered down state by scheduling tasks and migrating data to active nodes, rather than waking up powered down nodes to process tasks in addition to maintaining the initial fixed interrupt IDs with no updates.

In various embodiments, node 220A is a master node in computing system 200 and interrupt controller 228 stores interrupt priorities of the multiple processor cores in computing system 200 for arbitrated interrupts. In an embodiment, steps used for handling arbitrated interrupts with unicast messages, rather than broadcast messages, are the steps described earlier for processing node 100. For example, arbitrated interrupts are serviced by the processor core selected by arbitration logic based on a lowest interrupt priority. In some embodiments, interrupt controller 228 also stores fixed interrupt identifiers (IDs) for each of the processor cores in computing system 200. In an embodiment, the fixed interrupt identifiers (IDs) are Advanced Programmable Interrupt Controller (APIC) IDs. In contrast to arbitrated interrupts, when a given processor core in computing system 200 asserts a fixed interrupt, the given processor core needs to send the fixed interrupt to a particular processor core with a fixed interrupt ID that matches the asserted fixed interrupt.

In an embodiment, the fixed interrupt IDs are assigned by software, such as the operating system, in a sequential manner. Therefore, interrupt controller 228 in node 220A and each interrupt controller in nodes 220B-220D stores ranges of fixed interrupt IDs, rather than stores each individual fixed interrupt ID. Using the earlier example where a CPU includes 8 cores, each including 2 hardware threads for processing 2 software threads, the CPU has 16 fixed interrupt IDs. In the illustrated embodiment, computing system 200 has 4 nodes, each with a similar CPU, and thus, there are 64 fixed interrupt IDs. Rather than each one of nodes 220A-220D using a 64-entry table to store the individual fixed interrupt IDs, in an embodiment, each one of nodes 220A-220D stores 2 fixed interrupt IDs for each node, or 8 total fixed interrupt IDs.

In one embodiment, each one of nodes 220A-220D stores for each node in computing system 200 a start fixed interrupt ID and an end fixed interrupt ID of a range of sequential fixed interrupt IDs. For example, if the operating system sequentially assigns fixed interrupt IDs 0 to 15 to node 220A, then each one of nodes 220A-220D stores the values 0 and 15 for node 220A, rather than each of the sixteen fixed interrupt IDs. When a given core in node 220C in computing system 200 asserts a fixed interrupt with a fixed interrupt ID 9, the lookup into the relatively small storage of fixed interrupt IDs for computing system 200 indicates node 220A has the processor core assigned for servicing the fixed interrupt with ID 9. Afterward, node 220C sends a unicast message to node 220A to service the fixed interrupt with the processor core assigned the fixed interrupt ID 9. No broadcast probes are sent to discover with node of nodes 220A-220D has the processor core assigned for servicing the fixed interrupt with ID 9.

Although relatively rare, it is possible for the operating system to reassign fixed interrupt IDs. In some embodiments, one or more of nodes 220A-220D snoops the initial software copy of the assigned fixed interrupt IDs. In one embodiment, the location is known, such as the memory address range, and a read operation followed by a check is performed to determine whether any changes occurred. In another embodiment, a software process is called to check the initial values and report the results. If an update of the initial fixed interrupt IDs occurred, then in one embodiment, each of the nodes 220A-220D invalidates its copy of fixed interrupt IDs. Following, broadcast messages are used to service fixed interrupts. In another embodiment, each of the nodes 220A-220D updates its copy of fixed interrupt IDs. Following, unicast messages are still used to service fixed interrupts.

Figure 3:
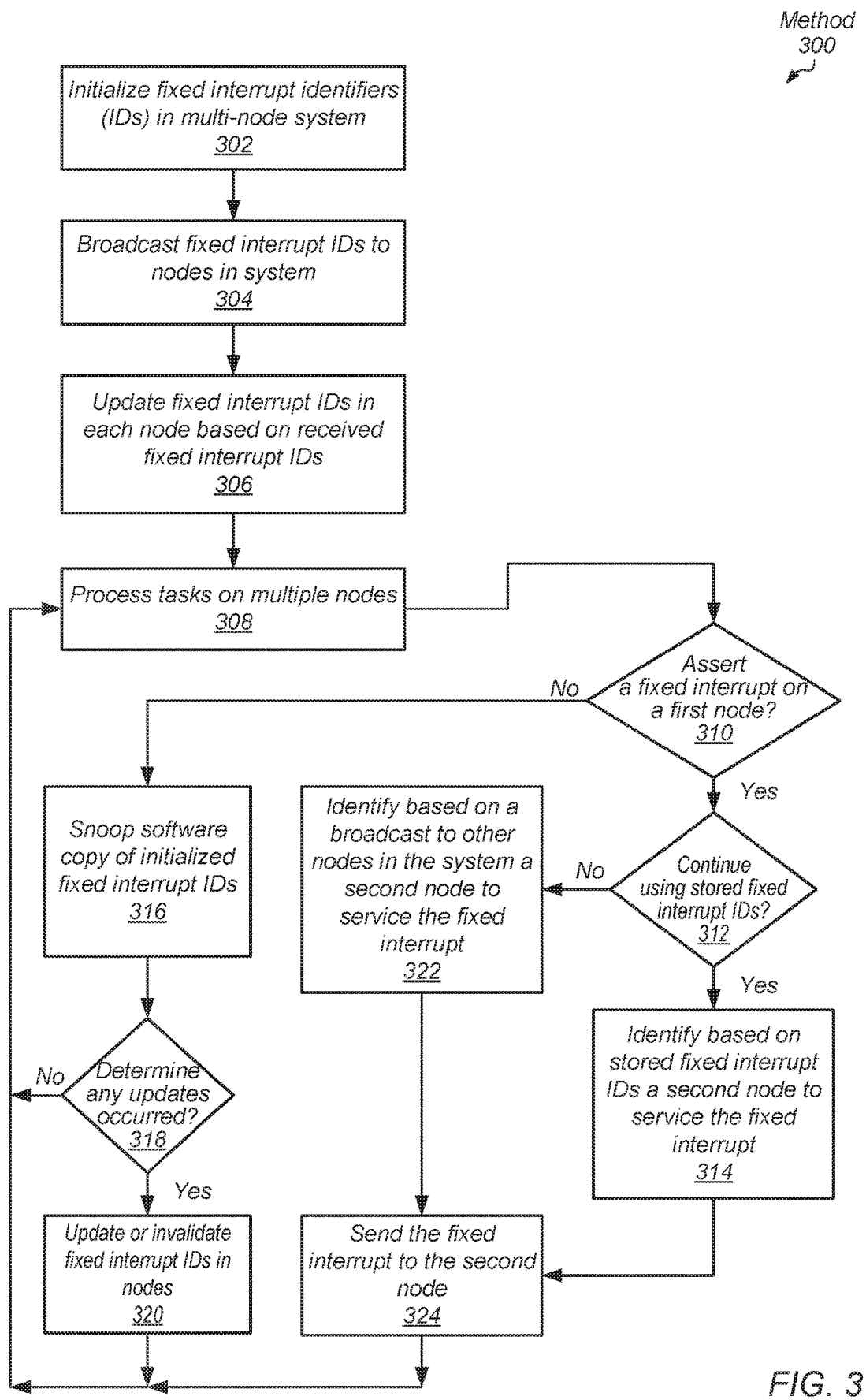
FIG. 3 is a flow diagram of one embodiment of a method for performing power management for a multi-node computing system.

Referring now to FIG. 3, one embodiment of a method 300 for performing power management for a multi-node computing system is shown. For purposes of discussion, the steps in this embodiment (as well as in FIGS. 4-6) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300.

Fixed interrupt identifiers (IDs) are initialized in a multi-node system (block 302). The fixed interrupt IDs specify which processor core or which hardware thread within a processor core is assigned to service a fixed interrupt with a matching fixed interrupt ID. In various embodiments, the operating system initializes the fixed interrupt IDs, and in an embodiment, the fixed interrupt IDs are initialized in a sequential manner. The fixed interrupt IDs are broadcast to the nodes in the computing system (block 304). For example, the operating system sends indications of the fixed interrupt IDs for the computing system to each of the nodes. Alternatively, one or more nodes snoop particular memory locations to obtain the fixed interrupt IDs for the computing system. In yet other examples, one or more nodes perform a system call to the operating system to determine the fixed interrupt IDs for the computing system. Each node updates a copy of fixed interrupt IDs for each node based on the received fixed interrupt IDs (block 306). Therefore, broadcast messages are not needed for handling fixed interrupts.

The multiple nodes process tasks (block 308). One or more clients within the nodes execute computer programs, or software applications. In some embodiments, the multiple nodes are within a multi-socket server and batch jobs are received by the operating system, which assigns tasks to the one or more of the multiple nodes. In various embodiments, the multi-node computing system utilizes a non-uniform memory access (NUMA) architecture and each of the nodes is a NUMA node.

If a first node asserts a fixed interrupt ("yes" branch of the conditional block 310), and the stored fixed interrupt IDs are still being used ("yes" branch of the conditional block 312), then a second node to service the fixed interrupt is identified based on the stored fixed interrupt IDs (block 314). The fixed interrupt is sent to the second node in a unicast message (block 324). No broadcast messages are used to service the fixed interrupt. Therefore, if the second node is in an active state, no powered down nodes were wakened up to service the fixed interrupt.

If no node asserts a fixed interrupt ("no" branch of the conditional block 310), then the software copy of initialized fixed interrupt IDs is snooped (block 316). As described earlier, one or more of the nodes in the computing system snoops the initial software copy of the assigned fixed interrupt IDs. In one embodiment, the location is known, such as the memory address range, and a read operation followed by a check is performed to determine whether any changes occurred. In another embodiment, a software process is called to check the initial values and report the results. If it is determined any updates occurred ("yes" branch of the conditional block 318), then the storage of the fixed interrupt IDs in the multiple nodes are either updated or invalidated (block 320). The decision to invalidate or update is a design choice based on a frequency of the updates and the manner used to store the copies of the fixed interrupt IDs. As described earlier, ranges of fixed interrupt IDs are stored, rather than each individual fixed interrupt ID. Storing ranges reduces the amount of storage used.

If it is determined no updates occurred ("no" branch of the conditional block 318), then control flow of method 300 returns to block 308 where tasks are processed by the multiple nodes. If the first node asserts a fixed interrupt ("yes" branch of the conditional block 310), but the stored fixed interrupt IDs are no longer being used ("no" branch of the conditional block 312), then a second node to service the fixed interrupt is identified based on broadcast messages to other nodes in the system (block 322). Afterward, the fixed interrupt is sent to the second node in a unicast message (block 324).

Figure 4:
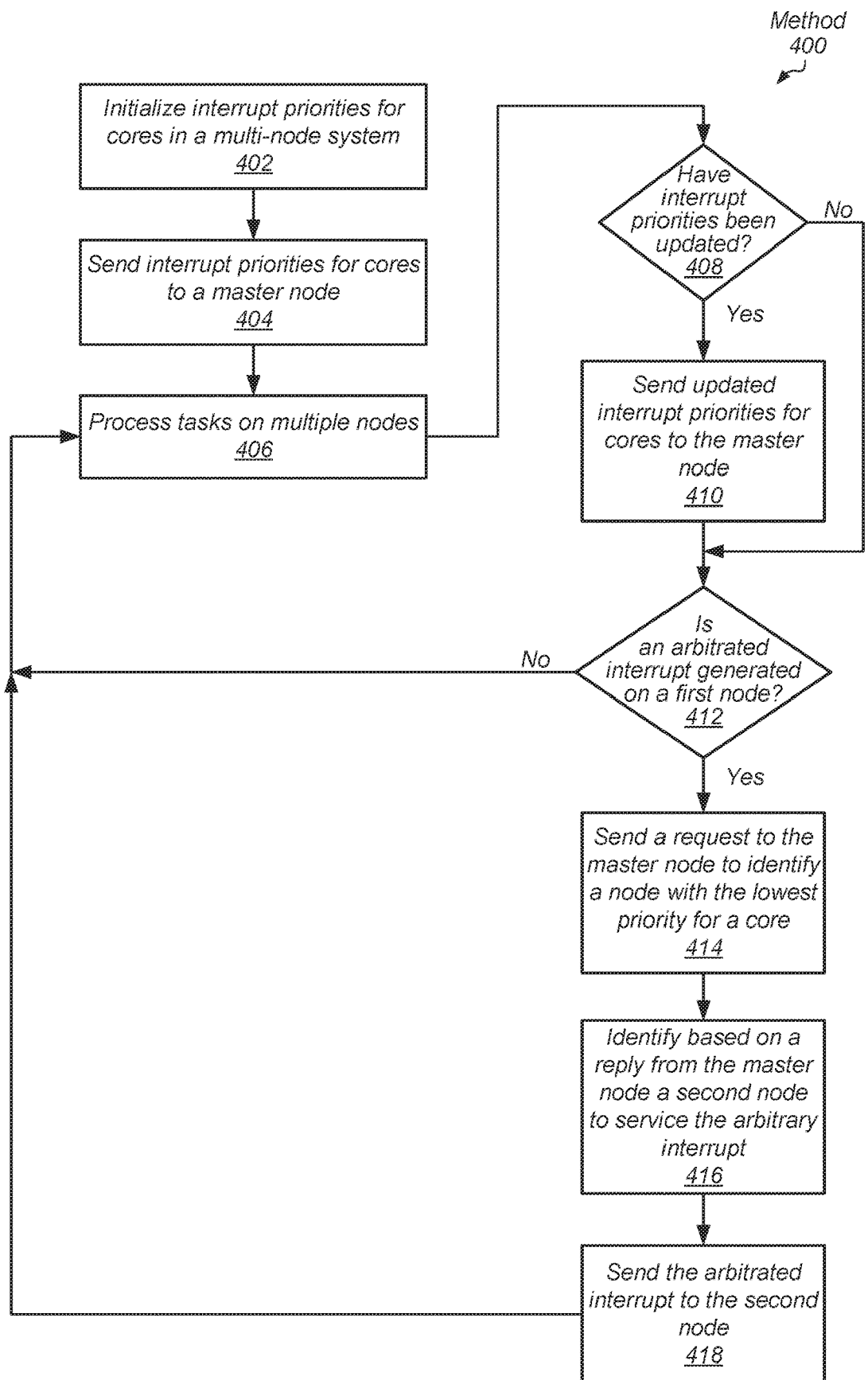
FIG. 4 is a flow diagram of another embodiment of a method for performing power management for a multi-node computing system.

Referring now to FIG. 4, another embodiment of a method 400 for performing power management for a multi-node computing system is shown. Similar to method 300, the multi-node computing system for method 400 utilizes a non-uniform memory access (NUMA) architecture and each of the nodes is a NUMA node. Interrupt priorities for arbitrated interrupts are initialized in a multi-node system (block 402). In an embodiment, the lowest valued interrupt priority specifies which processor core or which hardware thread within a processor core is assigned to service an arbitrated interrupt.

The interrupt priorities are broadcast to a master node of the multiple nodes in the computing system (block 404). For example, the operating system sends indications of the interrupt priorities for the computing system to the master node. Alternatively, the master node snoops particular memory locations to obtain the interrupt priorities for arbitrated interrupts. In yet other examples, the master node performs a system call to the operating system to determine the interrupt priorities for the computing system.

The multiple nodes process tasks (block 406). One or more clients within the nodes execute computer programs, or software applications. In some embodiments, the multiple nodes are within a multi-socket server and batch jobs are received by the operating system, which assigns tasks to the one or more of the multiple nodes. In various embodiments, a background process runs which allows the operating system to update interrupt priorities of the cores. If interrupt priorities for the cores are updated ("yes" branch of the conditional block 408), then the updated interrupt priorities for the cores are sent to the master node (block 410). In some embodiments, the master node stores only the lowest interrupt priority for each node. If the lowest interrupt priority is not updated, then in an embodiment, no update is sent to the master node.

If no node asserts an arbitrated interrupt ("no" branch of the conditional block 412), then control flow of method 400 returns to block 406 where the multiple nodes process tasks. If a first node asserts an arbitrated interrupt ("yes" branch of the conditional block 412), then a request is sent to the master node to identify a node with the lowest priority for a core (block 414). The request is a single unicast message, rather than multiple broadcast messages. Based on a reply from the master node, a second node is identified to service the arbitrated interrupt (block 416).

When multiple cores have a same interrupt priority, in an embodiment, the master node selects an active node from the multiple nodes. If there are multiple active nodes, then the master node uses a round-robin scheme, a distance scheme to select a node with a least number of hops from the requesting node, or other selection scheme. The arbitrated interrupt is sent to the second node in a unicast message (block 418). No broadcast messages are used to service the arbitrated interrupt. Therefore, if each of the master node and the second node is in an active state, then no powered down nodes were wakened to service the fixed interrupt.

Figure 5:
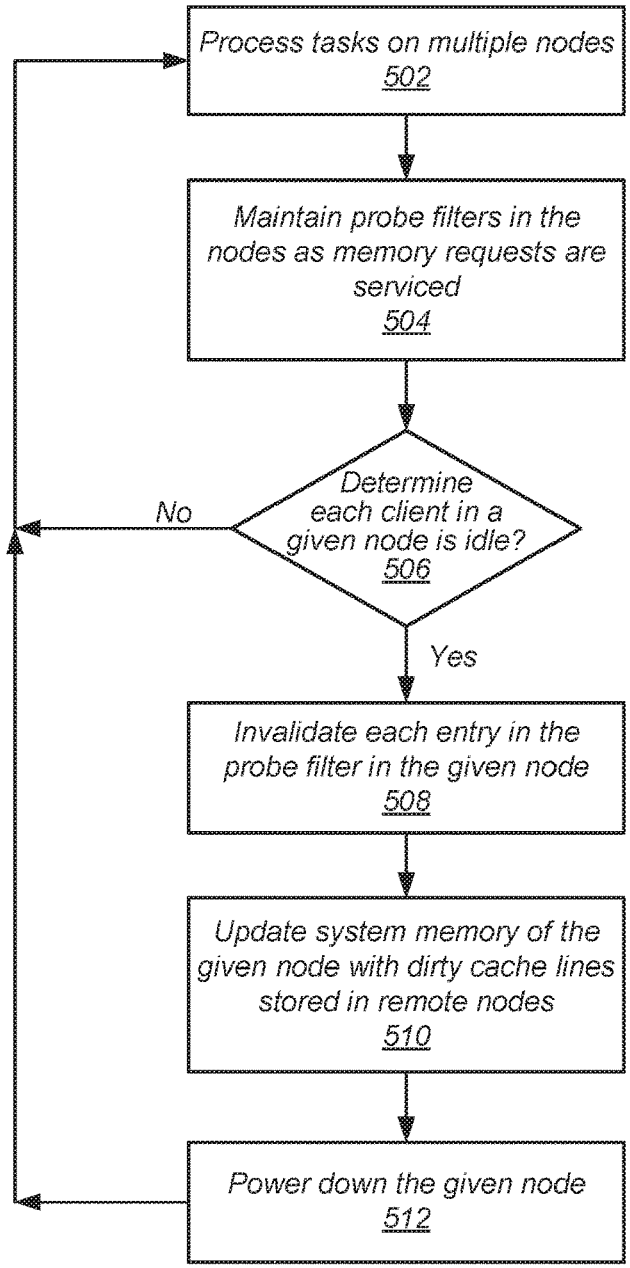
FIG. 5 is a flow diagram of another embodiment of a method for performing power management for a multi-node computing system.

Referring now to FIG. 5, another embodiment of a method 500 for performing power management for a multi-node computing system is shown. Similar to methods 300 and 400, the multi-node computing system for method 500 utilizes a non-uniform memory access (NUMA) architecture and each of the nodes is a NUMA node. The multiple nodes process tasks (block 502). Each of the multiple nodes maintains a probe filter as memory requests are serviced (block 504).

If a given node determines each of its one or more clients is idle ("yes" branch of the conditional block 506), then the given node invalidates each entry in the probe filter (block 508). In some embodiments, the given node also determines that there are no remote memory requests attempting to access its system memory prior to invalidating entries in the probe filter. The given node updates its system memory with dirty cache lines stored in remote nodes, which are received due to the invalidated entries and corresponding messages or probes sent to the remote nodes (block 510). Afterward, the given node powers down (block 512). In various embodiments, powering down the given node includes one or more of disabling drivers for link interfaces, disabling clocks for clients and a communication fabric, and setting system memory to perform self-refresh when DRAM is used.

Figure 6:
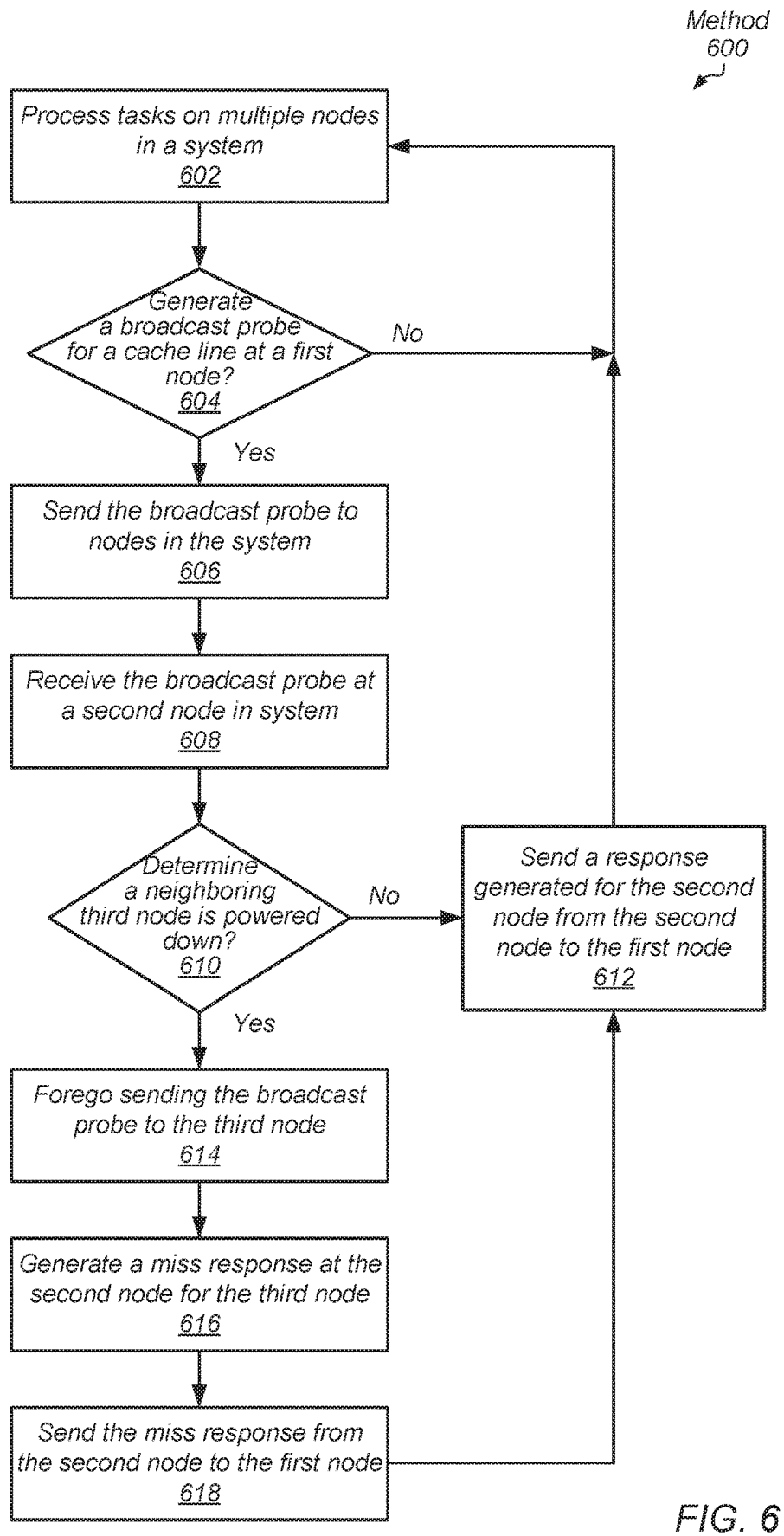
FIG. 6 is a flow diagram of another embodiment of a method for performing power management for a multi-node computing system.

Referring now to FIG. 6, another embodiment of a method 600 for performing power management for a multi-node computing system is shown. Similar to methods 300-500, the multi-node computing system for method 600 utilizes a non-uniform memory access (NUMA) architecture and each of the nodes is a NUMA node. The multiple nodes process tasks (block 602). If a first node generates a broadcast probe for a cache line ("yes" branch of the conditional block 604), then the broadcast probe is sent to other nodes in the system (block 606). A second node in the computing system receives the broadcast probe (block 608).

If the second node does not determine any neighboring node is powered down ("no" branch of the conditional block 610), then the second node sends a response generated for the second node from the second node to the first node (block 612). The second node also relays the broadcast probe to one or more other neighboring nodes based on the connectivity of nodes used in the selected node topology.

If the second node determines a neighboring third node is powered down ("yes" branch of the conditional block 610), then the second node foregoes sending the broadcast probe to the third node (block 614). The second node generates a miss response for the third node (block 616). The second node sends the miss response from the second node to the first node (block 618). Therefore, the second node spoofs a miss response on behalf of the powered down third node for a broadcast probe seeking a particular cache line. The third node is not awakened in order to respond with a miss response. Afterward, control flow of method 600 moves to block 612.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computing system comprising:
    a plurality of nodes, each comprising:
        one or more clients configured to process applications;
        a plurality of links coupled to other nodes of the plurality of nodes; and
        a power controller; and
    wherein in response to receiving a broadcast probe from a first node of the plurality of nodes, a second node of the plurality of nodes is configured to:
        generate a miss response for a third node of the plurality of nodes directly connected to the second node responsive to determining the third node is powered down; and
        send the miss response to the first node.

2. The computing system as recited in claim 1, wherein in response to generating a broadcast probe, the first node of the plurality of nodes is configured to:
    generate a miss response for a fourth node of the plurality of nodes directly connected to the first node responsive to determining the fourth node is powered down.

3. The computing system as recited in claim 1, wherein the first node is configured to:
  maintain a probe filter as memory requests are serviced; and
  in response to determining each client of the one or more clients is idle:
    invalidate each entry in the probe filter; and
    update a system memory connected to the first node with dirty cache lines received as a result of invalidating entries in the probe filter; and
    power down the plurality of links and the one or more clients of the first node.

4. The computing system as recited in claim 1, wherein at least one client of the one or more clients comprises a plurality of cores, and wherein a master node of the plurality of nodes is configured to store interrupt priorities of the plurality of cores in the plurality of nodes for arbitrated interrupts.

5. The computing system as recited in claim 4, wherein in response to detecting an arbitrated interrupt, the first node is configured to:
  send a request to the master node to identify a given core with a lowest priority and a given node comprising the given core; and
  send a request to the given node to handle the arbitrated interrupt with the given core based on a response from the master node identifying the given core and the given node.

6. The computing system as recited in claim 4, wherein in response to determining priorities of cores for arbitrated interrupts are updated in the first node, the first node is configured to send the updated priorities to the master node for updating priorities of cores for arbitrated interrupts stored on the master node.

7. The computing system as recited in claim 1, wherein at least one client of the one or more clients comprises a plurality of cores, and wherein at least the first node is configured to store an indication of a fixed interrupt identifier (ID) for each core of the plurality of cores.

8. The computing system as recited in claim 7, wherein in response to detecting a fixed interrupt, the first node is configured to:
  identify a given node comprising a given core with a fixed interrupt ID that matches a fixed interrupt ID of the detected fixed interrupt; and
  send a request to the given node to handle the fixed interrupt with the given core.

9. A method, comprising:
  processing applications by a plurality of nodes, each comprising:
    one or more clients configured to process the applications;
    a plurality of links coupled to other nodes of a plurality of nodes; and
    a power controller; and
  in response to receiving a broadcast probe from a first node of the plurality of nodes, a second node of the plurality of nodes is configured to:
    generating, by a second node of the plurality of nodes, a miss response for a third node of the plurality of nodes directly connected to the second node responsive to determining the third node is powered down; and
    sending, by the second node, the miss response to the first node.

10. The method as recited in claim 9, wherein in response to generating a broadcast probe:
  generating, by the first node, a miss response for a fourth node of the plurality of nodes directly connected to the first node responsive to determining the fourth node is powered down.

11. The method as recited in claim 9, further comprising:
  maintaining, by the first node, a probe filter as memory requests are serviced; and
  in response to determining each client of the one or more clients in the first node is idle:
    invalidating each entry in the probe filter; and
    updating a system memory connected to the first node with dirty cache lines received as a result of invalidating entries in the probe filter; and
    powering down the plurality of links and the one or more clients of the first node.

12. The method as recited in claim 9, wherein at least one client of the one or more clients comprises a plurality of cores, and the method further comprises storing, by a master node of the plurality of nodes, interrupt priorities of the plurality of cores in the plurality of nodes for arbitrated interrupts.

13. The method as recited in claim 12, wherein in response to detecting an arbitrated interrupt, the method further comprises:
  sending, by the first node, a request to the master node to identify a given core with a lowest priority and a given node comprising the given core; and
  sending, by the first node, a request to the given node to handle the arbitrated interrupt with the given core based on a response from the master node identifying the given core and the given node.

14. The method as recited in claim 13, wherein in response to determining priorities of cores for arbitrated interrupts are updated in the first node, the method further comprises sending, by the first node, the updated priorities to the master node for updating priorities of cores for arbitrated interrupts stored on the master node.

15. The method as recited in claim 9, wherein at least one client of the one or more clients comprises a plurality of cores, and the method further comprises storing, by at least the first node, an indication of a fixed interrupt identifier (ID) for each core of the plurality of cores.

16. The method as recited in claim 15, wherein in response to detecting a fixed interrupt, the method further comprises:
  identifying, by the first node, a given node comprising a given core with a fixed interrupt ID that matches a fixed interrupt ID of the detected fixed interrupt; and
  sending, by the first node, a request to the given node to handle the fixed interrupt with the given core.

17. A processing node comprising:
  one or more clients configured to process applications;
  a plurality of links coupled to other nodes of a plurality of nodes; and
  control logic; and
  wherein in response to receiving a broadcast probe from a first node of a plurality of nodes, the control logic is configured to:
    generate a miss response for a second node of the plurality of nodes directly connected to the processing node responsive to determining the second node is powered down; and
    send the miss response to the first node.

18. The processing node as recited in claim 17, wherein in response to generating a broadcast probe, the control logic is configured to:

generate a miss response for a third node of the plurality of nodes directly connected to the processing node responsive to determining the third node is powered down.

19. The processing node as recited in claim 17, wherein the control logic is configured to:
    maintain a probe filter as memory requests are serviced; and
    in response to determining each client of the one or more clients is idle:
        invalidate each entry in the probe filter; and
        update a system memory connected to the processing node with dirty cache lines received as a result of invalidating entries in the probe filter; and
        power down the plurality of links and the one or more clients.

20. The processing node as recited in claim 17, wherein at least one client of the one or more clients comprises a plurality of cores, and wherein the processing node is a master node of the plurality of nodes configured to store interrupt priorities of a plurality of cores in the plurality of nodes for arbitrated interrupts.

\* \* \* \* \*